United States Patent [19]

Sakanaka et al.

[11] Patent Number: 5,594,580
[45] Date of Patent: Jan. 14, 1997

[54] OPTICAL SPACE COMMUNICATION APPARATUS

[75] Inventors: Tetsuo Sakanaka, Sagamihara; Takehide Hamuro, Yokohama, both of Japan

[73] Assignee: Canon Kabushiki Kaisha, Tokyo, Japan

[21] Appl. No.: 340,301

[22] Filed: Nov. 14, 1994

[30] Foreign Application Priority Data

Nov. 16, 1993 [JP] Japan .................................. 5-309734

[51] Int. Cl.[6] ..................................................... H04B 10/00
[52] U.S. Cl. ............................................. 359/172; 359/159
[58] Field of Search .............................. 359/172, 152, 359/154, 159, 153, 169, 170, 191

[56] References Cited

U.S. PATENT DOCUMENTS

| | | | |
|---|---|---|---|
| 3,566,128 | 2/1971 | Arnuad | 359/191 |
| 4,662,004 | 4/1987 | Fredriksen et al. | 359/152 |
| 5,060,304 | 10/1991 | Solinsky | 359/159 |
| 5,065,455 | 11/1991 | Ito et al. | 359/159 |
| 5,142,400 | 8/1992 | Solinsky | 359/159 |
| 5,329,395 | 7/1994 | Endo et al. | 359/159 |
| 5,347,387 | 9/1994 | Rice | 359/159 |

FOREIGN PATENT DOCUMENTS

| | | | |
|---|---|---|---|
| 0241930 | 9/1989 | Japan | 359/159 |
| 2221810 | 2/1990 | United Kingdom | 359/159 |

OTHER PUBLICATIONS

D. L. Begley, R. A. Kobylinski and M. Ross, *Solid State Laser Cross–Link Systems an Technology*, International Journal of Satellite Communications vol. 6, 91–105 (1988).

I. Sheldon, E. Tamura, T. Otobe, Y Ito and J Kitayama, *Laser Beam Link System*, 18th International Television Symposium and Technical Exhibition, pp. 937–946 (1993).

J. E. Kaufmann and V. W. S. Chen, *Coherent Optical Intersatellite Crosslink Systems*, MILCOM 88 Conference Record vol. 2 of 3, pp., 533–540 (1988).

*Laboratory Model of a Bidirectional Diode Laser Data Link with Acquisition and Tracking Capability*, SPIE vol. 810, Optical Systems for Space Applications, pp. 239–244 (1987).

*Primary Examiner*—Wellington Chin
*Assistant Examiner*—Rafael Bacares
*Attorney, Agent, or Firm*—Fitzpatrick, Cella, Harper & Scinto

[57] ABSTRACT

An optical space communication apparatus for propagating a beam of light through free space to thereby effect communication includes a transmitting device for transmitting a first optical signal converted into a beam of light, a expanse angle varying device for varying the angle of expanse of the beam of light into which the first optical signal has been converted, a level varying device for varying the output level of the first optical signal, a control device for controlling the expanse angle varying device and the level varying device, and a receiving device for receiving a second optical signal converted into a beam of light.

14 Claims, 4 Drawing Sheets

5,594,580

1

OPTICAL SPACE COMMUNICATION APPARATUS

BACKGROUND OF THE INVENTION

1. Field of the Invention

This invention relates to an optical space communication apparatus for converting an optical signal modulated by a transmission signal into a beam of light and propagating the beam of light through the atmosphere to thereby effect communication between remote points.

2. Related Background Art

Generally, in communications utilizing optical signals, high-speed transmission of a large volume of information is possible and particularly, optical space communication using free space as a transmission path has an advantage that it abounds in portability as compared with wire communication as by optical fiber and its communication paths can be simply set up. In communication apparatuses according to the prior art, in order to improve the reliability of optical space communications, the correction, i.e., auto tracking, of the angle of a beam of light in the direction of emergence thereof is effected so that optical signals may not come off the apparatus.

FIG. 1 of the accompanying drawings shows the construction of an example of the prior art which is an optical space communication apparatus having the tracking function. On an optical path behind a lens 1 for transmission/ reception, there are disposed a lens 2 and a movable mirror 3, and two actuators 4 and 5 for changing the angle of the movable mirror 3 are mounted on the movable mirror 3. These actuators 4 and 5 are adapted to be driven by the output of a tracking control circuit 6. On an optical path downwardly extending from the movable mirror 3, there are disposed a polarizing beam splitter 7 transmitting therethrough a polarized plane component parallel to the plane of the drawing sheet and reflecting a polarized plane component perpendicular to the plane of the drawing sheet by a cemented surface 7a, a lens 8, and a light emitting element 9 comprising a semiconductor laser or the like, and the outputs of an amplifier 10 and a transmission signal input end 11 are successively connected to the light emitting element 9.

On the other hand, on the optical path in the direction of reflection of the polarizing beam splitter 7, there are disposed a beam dividing mirror 12, a lens 13 and a light receiving element 14 having four light receiving elements 14a–14d as shown in FIG. 2 of the accompanying drawings. The output of the light receiving element 14 is connected to the tracking control circuit 6. On the optical path in the direction of reflection of the beam dividing mirror 12, there are disposed a lens 15 and a light receiving element 17 comprising an avalanche photodiode, a PIN photodiode or the like, and the outputs of an amplifier 18 and a reception signal output end 19 are successively connected to the light receiving element 17. There is also provided a collimation scope 20 made substantially parallel to the optical axis of the lens 1 and for an operator to visually confirm a partner apparatus.

During transmission, when a transmission signal is inputted from the transmission signal input end 11, it is amplified by the amplifier 10, and thereafter is outputted to the light emitting element 9. The light emitting element 9 intensity-modulates oscillated light in accordance with the input signal and converts it into an optical signal. The oscillated

2 light from the light emitting element 9 passes through the lens 8 to the polarizing beam splitter 7, but this light is polarized in parallelism to the plane of the drawing sheet and therefore is intactly transmitted through the polarizing beam splitter 7, and is reflected leftwardly by the movable mirror 3, and is converted into a beam of light via the lenses 2 and 1, and emerges toward the partner apparatus.

During reception, the beam of light from the partner apparatus enters the lens 1 from left, is downwardly reflected by the movable mirror 3 and passes to the polarizing beam splitter 7. Since this beam of light is polarized in a direction perpendicular to the plane of the drawing sheet, it is rightwardly reflected by the cemented surface 7a of the polarizing beam splitter 7, and is divided into two directions by the beam dividing mirror 12. The beam of light reflected by the beam dividing mirror 12 is received by the light receiving element 17 and is converted into an electrical signal thereby, whereafter the electrical signal is amplified to a suitable level by the amplifier 18 and is outputted from the reception signal output end 19.

On the other hand, the beam of light transmitted through the beam dividing mirror 12 is condensed by the lens 13, and is received as a spot image S comprising a small circle as shown in FIG. 2 by the light receiving element 14. In the light receiving element 14, the outputs of the four light receiving elements 14a–14d are compared with one another to thereby find the position of the spot image S, which is outputted as a position signal to the tracking control circuit 6. On the basis of this position signal, the tracking control circuit 6 calculates the angle the beam of light from the partner apparatus forms with respect to the optical path of the host apparatus, and makes a driving signal for the actuators 4 and 5. The actuators 4 and 5 adjust the angle of the movable mirror 3 so that the spot image S may be received by the center of the light receiving element 14. Along therewith, the position of the light emitting element 9 is also adjusted and thus, the optical paths of the emergent beam of light and the incident beam of light coincide with each other, that is, the beam of light is accurately transmitted toward the partner apparatus. When during communication, the apparatus is inclined and the optical path of the received light deviates and the position of the spot image S on the light receiving element 14 deviates from the center, the movable mirror 3 is immediately moved and the optical path for the incidence of the beam of light is sequentially modified so that the spot image S may be received by the center of the light receiving element 14, thereby preventing the incident beam of light from deviating from the apparatus.

The above-described tracking function will not operate unless the beam of light from the partner apparatus arrives at a receivable level and the spot image S is received by a portion of the light receiving element 14. Accordingly, in the initial adjustment during the installation of the apparatus, the operator fixes the movable mirror 3 at an initial position near the midpoint, and manually effects the adjustment of the angle of a base 100 to thereby effect the adjustment of the direction of the entire apparatus while observing the partner apparatus by means of the collimation scope 20.

In the optical space communication apparatus, during communication, the beam of light is used in the state of a parallel beam of light. For example, when the beam diameter at the receiving point is set to the order of 2 m, the angle of expanse of the beam of light on the transmitting side is set to the order of 0.2° for a transmission distance of 500 m, and is set to a small angle of expanse of the order of 0.06° for a transmission distance of 2,000 m. Accordingly, when the adjustment of the direction of the entire apparatus is effected in the state of the same narrow angle of expanse of the beam of light as that during communication, a manual adjusting mechanism by the base 100 of high accuracy becomes necessary and the operation of adjusting the direction becomes cumbersome, and this leads to a high cost.

Also, whether the light receiving element 14 is receiving the spot image S can be confirmed by monitoring the light reception signal of the light receiving element 14, but whether the beam of light from the host apparatus is being received by the light receiving element of the partner apparatus cannot be confirmed from the host apparatus side. To ensure the beam of light to be received by the partner apparatus while observing the partner apparatus by means of the collimation scope 20 in this state, it is necessary that a value including the error of the angle of emergence of the beam of light and the visual confirmation error of the collimation scope 20 be suppressed to a small level. Therefore, not only requirements for the accuracy of the angle of the collimation scope 20 relative to the transmitting optical system during manufacture and the reproducibility of the midpoint position of the movable mirror 3 become severe, but also tolerance for the deviation of the collimation angle of the collimation scope 20 by a vibration, a shock, a variation with time or the like is quite limited even after manufacture, and this leads to difficulties in manufacture and high cost.

SUMMARY OF THE INVENTION

It is the object of the present invention to provide an optical space communication apparatus which is simplified in the angle mechanism thereof and can effect the adjustment of direction easily and accurately.

To achieve the above object, an optical space communication apparatus for propagating a beam of light through free space to thereby effect communication according to the present invention is characterized by:

transmitting means for transmitting a first optical signal converted into a beam of light;

expanse angle varying means for varying the angle of expanse of the beam of light into which the first optical signal has been converted;

level varying means for varying the output level of the first optical signal;

control means for controlling the expanse angle varying means and the level varying means; and receiving means for receiving a second optical signal converted into a beam of light.

Also, to achieve the above object, an optical space communication apparatus for propagating a beam of light through free space to thereby effect communication according to the present invention is characterized by:

transmitting means for transmitting a main signal and a pilot signal converted into beams of light;

expanse angle varying means for varying the angles of expanse of the beams of light into which the main signal and the pilot signal have been converted;

level varying means for varying the output levels of the main signal and the pilot signal;

control means for controlling the expanse angle varying means and the level varying means; and receiving means for receiving an optical signal converted into a beam of light.

Also, a method of adjusting the direction of emergence of a beam of light in an optical space communication system for propagating a beam of light through free space to thereby effect communication according to the present invention comprises the steps of:

transmitting a first optical signal converted into a first beam of light from a first optical space communication apparatus to a second optical space communication apparatus;

varying the angle of expanse of the first beam of light into which the first optical signal has been converted and varying the output level of the first optical signal when executing the step;

transmitting a second optical signal converted into a second beam of light from the second optical space communication apparatus to the first optical space communication apparatus;

varying the angle of expanse of the second beam of light into which the second optical signal has been converted and varying the output level of the second optical signal when executing the step; and adjusting the directions of emergence of the first beam of light and the second beam of light.

DESCRIPTION OF THE PREFERRED EMBODIMENTS

The present invention will hereinafter be described in detail with respect to an embodiment thereof shown in FIGS. 3 to 5D.

Figure 1:
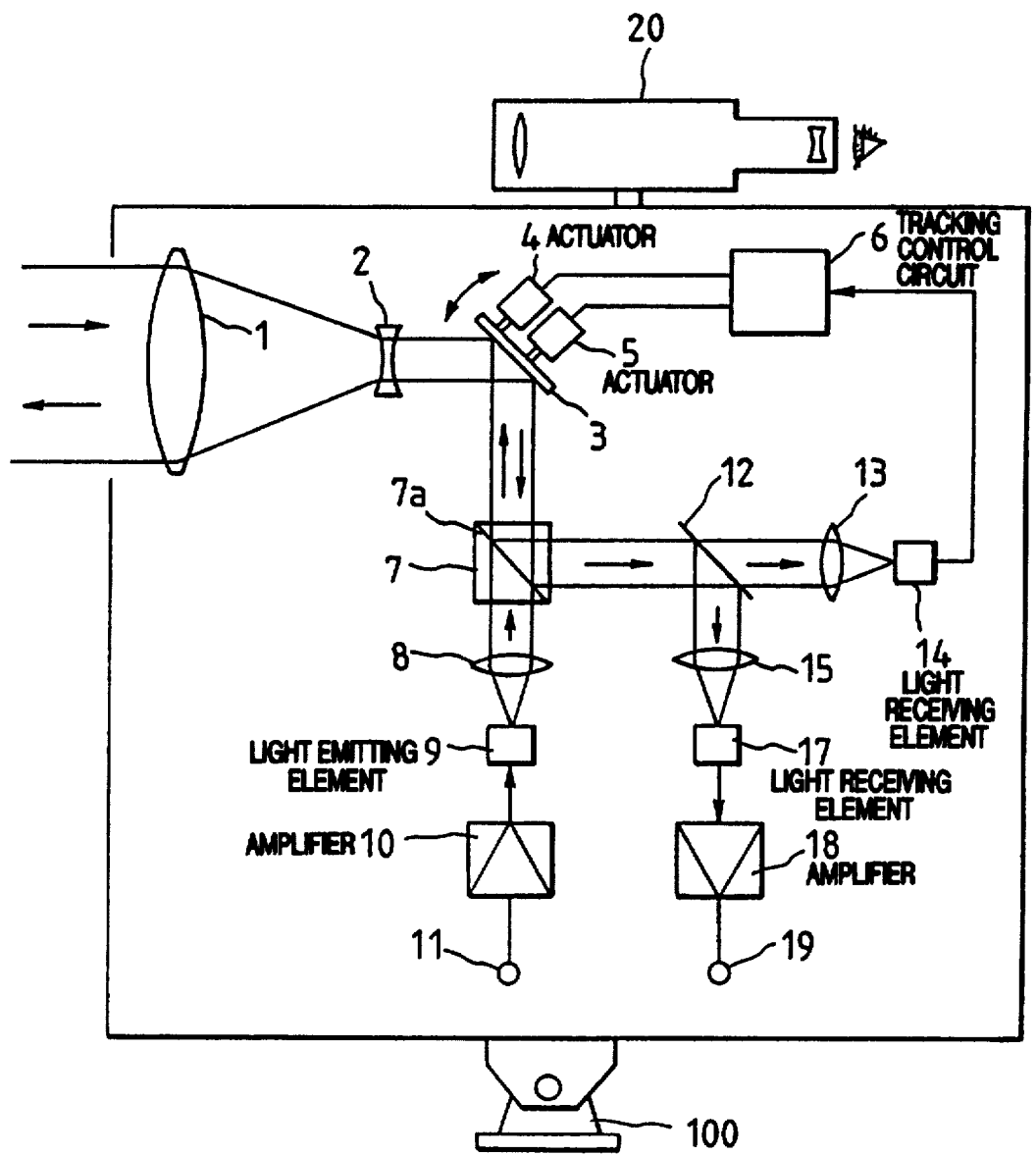
FIG. 1 shows the construction of an example of the prior art.
Figure 2:
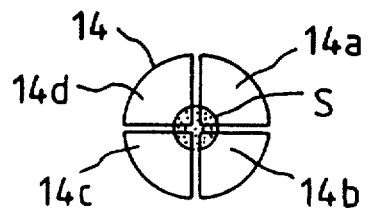
FIG. 2 is a front view of a photodiode.
Figure 3:
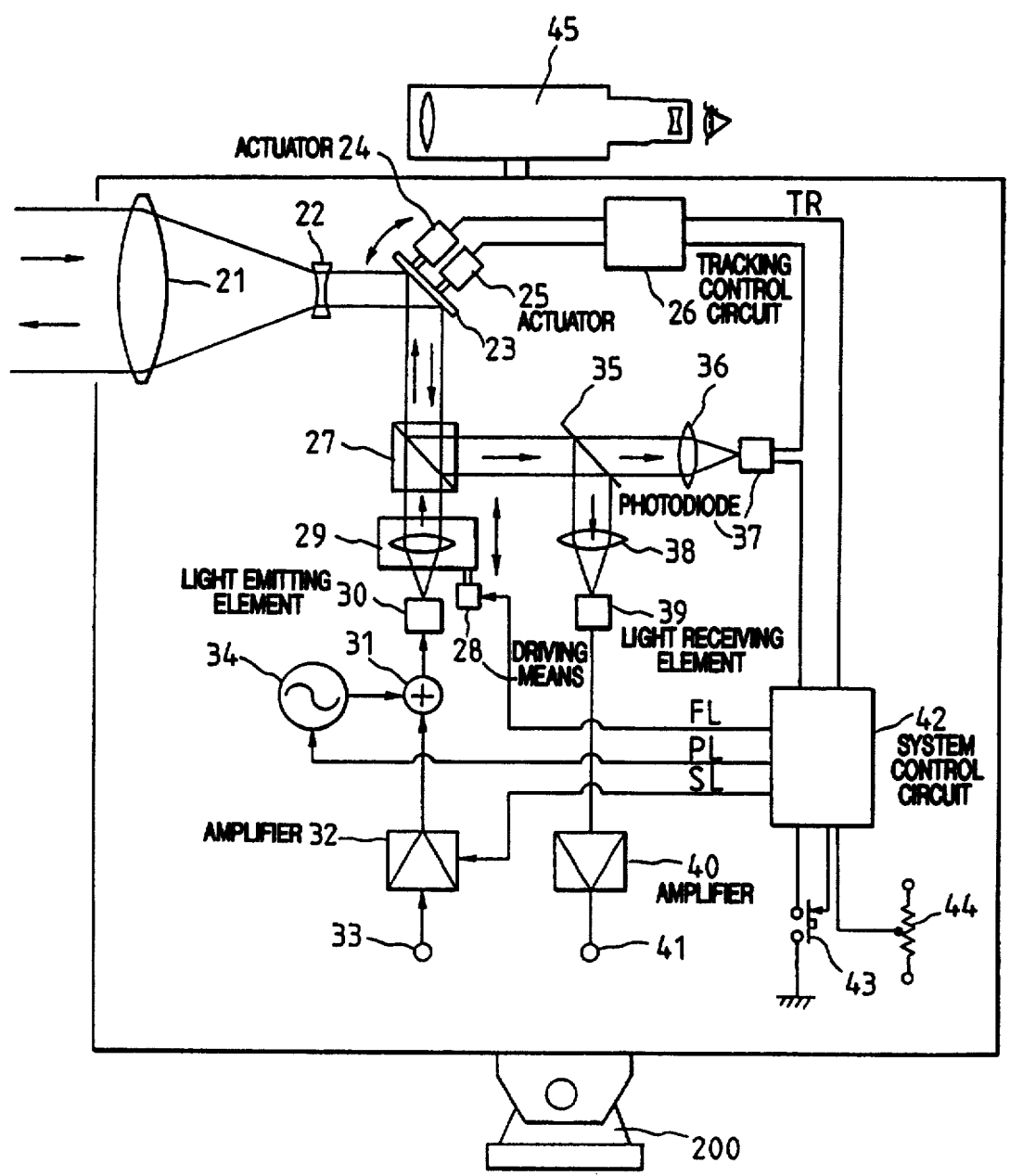
FIGS. 3 and 4 show the construction of a first embodiment of the optical space communication apparatus of the present invention.

Referring to FIG. 3 which shows the construction of a first embodiment of the optical space communication apparatus of the present invention, a lens 22 and a movable mirror 23 are disposed on the optical path behind a lens 21 which is the entrance and exit of the apparatus. Actuators 24 and 25 are mounted on the movable mirror 23, and the output of a tracking control circuit 26 is connected to these actuators. A polarizing beam splitter 27 transmitting therethrough a polarized wave parallel to the plane of the drawing sheet and reflecting a polarized wave orthogonal to the plane of the drawing sheet, a collimator lens 29 movable along the optical path by driving means 28, and a light emitting element 30 comprising a semiconductor laser or the like are successively arranged on the optical path in the direction of reflection of the movable mirror 23, the outputs of a wave combiner 31, an amplifier 32 and a transmission signal input end 33 are successively connected to the light emitting element 30, and the output of a pilot signal oscillator 34 is connected to the wave combiner 31.

A beam dividing mirror 35, a lens 36 and a PIN photodiode 37 having four light receiving elements similar to the light receiving element 14 in the example of the prior art are disposed on the optical path in the direction of reflection of the polarizing beam splitter 27, and the output of the PIN photodiode 37 is connected to the tracking control circuit 26. Also, a lens 38 and a light receiving element 39 are disposed on the optical path in the direction of reflection of the beam dividing mirror 35, and the output of the light receiving element 39 is connected to an amplifier 40 and a reception signal output end 41.

Further, a system control circuit 42 is provided to control the entire apparatus, the output of the system control circuit 42 is connected to the tracking control circuit 26, the driving means 28, the amplifier 32 and the pilot signal oscillator 34, and a tracking start switch 43 and the output of a distance setting device 44 for setting the transmission distance are connected to the system control circuit 42. Also, a collimation scope 45 is provided outside the apparatus. A base 200 for manually effecting the adjustment of the angle of the entire apparatus is also provided outside the apparatus.

In case of transmission, information is inputted as a main signal from the transmission signal input end 33 and is amplified by the amplifier 32, and thereafter is outputted to the wave combiner 31. The wave combiner 31 superposes the main signal and a pilot signal for tracking from the pilot signal oscillator 34 one upon the other, and thereafter outputs them to the light emitting element 30. The semiconductor laser in the light emitting element 30 modulates oscillated light on the basis of an input signal and converts it into an optical signal. The oscillated light from the light emitting element 30 is polarized in parallelism to the plane of the drawing sheet, passes through the polarizing beam splitter 27, is reflected by the movable mirror 23, is converted into a beam of light via the lenses 22 and 21 and emerges into space.

The transmitted optical signal comprises a main signal including information and a pilot signal for tracking. The main signal is a high band signal including also a high frequency component, and the pilot signal is a narrow band signal comprising a low frequency component which does not overlap the frequency band of the main signal. Accordingly, the pilot signal can be received in a narrow band and therefore, a high S/N ratio is obtained even at a low level and thus, during ordinary communication, the level distribution ratio of the pilot signal is set lower than that of the main signal in order to make the influence imparted to the main signal small.

In case of reception, such an optical signal comprising the main signal including information and the pilot signal for tracking enters from the lens 21 and is condensed, and is made into parallel light by the lens 22 and the parallel light is reflected by the movable mirror 23. Thereafter, this light, which is a polarized wave orthogonal to the plane of the drawing sheet, is reflected by the polarizing beam splitter 27 and is divided into two directions by the beam dividing mirror 35. The beam of light transmitted through the beam dividing mirror 35 passes through the lens 36 and is received as a spot image S comprising a small circle by the PIN photodiode 37. On the other hand, the beam of light reflected by the beam dividing mirror 35 passes through the lens 38 and is received by the light receiving element 39.

The light receiving element 39, which is high in response speed, receives the main signal of a high frequency band and converts it into an electrical signal. This signal is amplified by the amplifier 40, and thereafter is outputted from the reception signal output end 41. On the other hand, the PIN photodiode 37, which is low in response speed, receives the pilot signal of a low frequency band of the optical signal and converts it into an electrical signal, and outputs it to the tracking control circuit 26. On the basis of this signal, the tracking control circuit 26 calculates the position of the spot image S on the PIN photodiode 37, and monitors the direction of reception of the optical signal.

Figure 4:
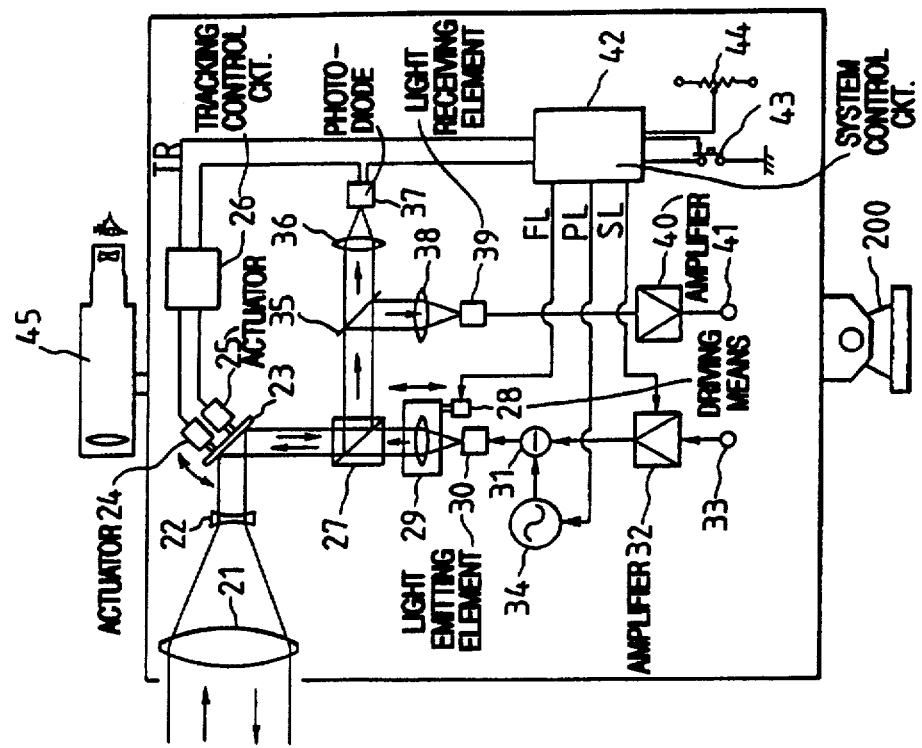
Figure 4:
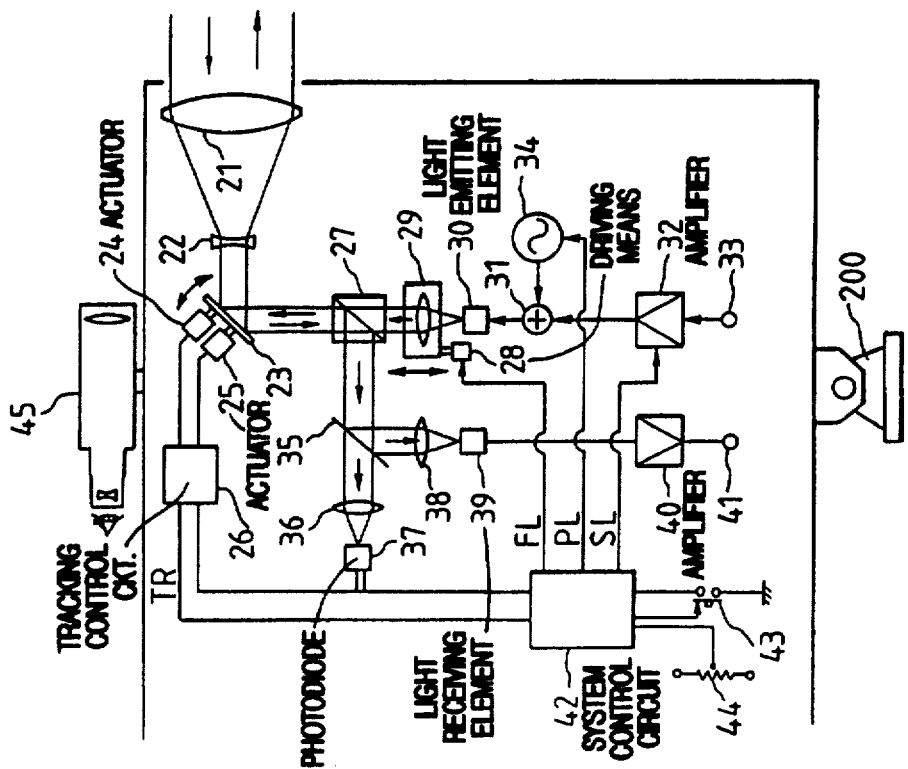

As the form in which this communication apparatus is used, the use within a wide range from short distance communication of several tens of meters to long distance communication of several kilometers as shown in FIG. 4 is conceivable.

In this communication apparatus, auto tracking by the PIN photodiode 37 and the movable mirror 23 is effected so that transmission/reception can always be done in the optimum direction after a user has made the adjustment of the direction of emergence of the beam of light by the base 200.

Figure 5A:
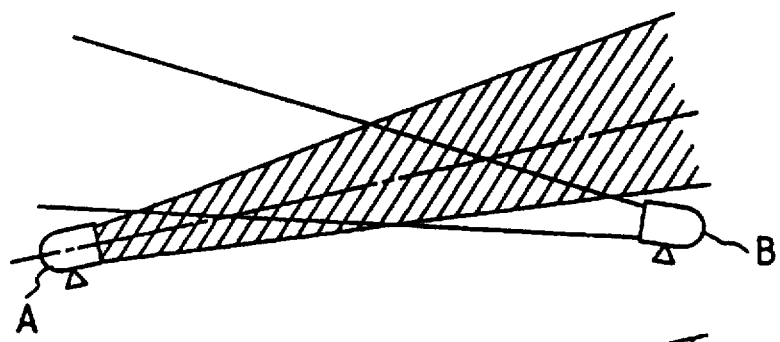
FIGS. 5A to 5D illustrate a variation in a beam of light resulting from the adjustment of the direction of emergence.
Figure 5B:
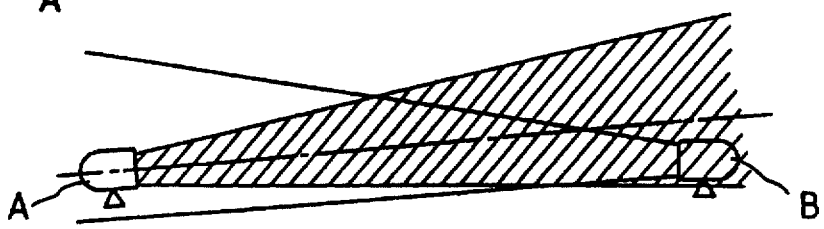

In FIGS. 5A to 5D, assuming that two apparatuses for effecting communication therebetween are apparatus A and apparatus B, the users of the two apparatuses A and B render the apparatuses into a transmission state (FIG. 5A), and manually effect the adjustment of the directions of the two apparatus while looking into the collimation scope 45 and observing the incident beam of light (FIG. 5A→FIG. 5B). At this time, in the apparatuses A and B, the system control circuit 42 outputs a command signal FL to the driving means 28. The collimator lens 29 is moved along the optical path by the driving means 28, thereby making the angle of expanse of the beam of light great as shown in FIG. 5A. Therefore, the beam of light from the host apparatus can be caused to enter the other apparatus by a simple operation. However, the transmitted optical signal is attenuated by the beam of light being expanded and therefore, the system control circuit 42 outputs a command signal PL to the pilot signal oscillator 34 in synchronism with outputting the command signal FL to the driving means 28. Thereupon, the pilot signal oscillator 34 outputs to the wave combiner 31 a pilot signal of a higher level than during ordinary communication to ensure the pilot signal to be reliably received by the partner apparatus.

When the level of the pilot signal is raised, a pilot signal harmonics may be created in the light emitting element 30 due to non-linear strain or an inter-modulation may be created between the pilot signal and the main signal, and the S/N ratio of the main signal is deteriorated by the influence thereof. In this state, however, communication is not intended and therefore, the deterioration of the main signal poses no problem. So, in synchronism with outputting the command signal PL to raise the level of the pilot signal, the system control circuit 42 may be designed to output a command signal SL to the amplifier 32 to make the level of the main signal lower than during communication. As a result, in the amplifier 32, the level of the main signal becomes nearly zero. In this case, the level of the pilot signal may be increased corresponding to the decrease in the level of the main signal.

Figure 5C:
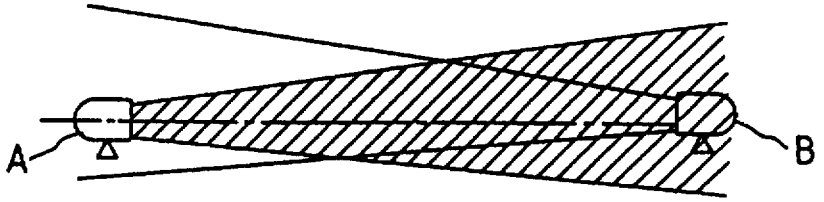

After the termination of the adjustment of the directions of emergence of the beams of light in the apparatus A and apparatus B (the state of FIG. 5B), the system control circuit 42 of the apparatus A confirms that the reception level of the pilot signal from the apparatus B is sufficient, and connects the tracking start switch 43 to thereby input the start of tracking to the system control circuit 42. In response to this input, the system control circuit outputs a command signal TR to the tracking control circuit 26. The tracking control circuit 26 compares the reception signals from the four light receiving elements of the PIN photodiode 37 with one another to thereby find the position of the spot image S and make a driving signal for the actuators 24 and 25. The actuators 24 and 25 adjust the angle of the movable mirror 23 so that the spot image S may be received by the center of the PIN photodiode 37, and the optical path of the beam of light from the apparatus A and the optical path of the beam of light from the apparatus B are made coincident with each other as shown in FIG. 5C.

Figure 5D:
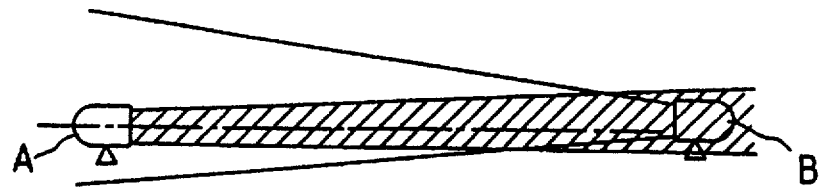

When in the apparatus A, the direction of emergence of the beam of light is determined, the system control circuit 42 outputs the command signal FL to the driving means 28 and also outputs the command signal PL to the pilot signal oscillator 34. The driving means 28 moves the collimator lens 29 to thereby make the angle of expanse of the beam of light smaller as shown in FIG. 5D. On the other hand, the pilot signal oscillator 34 reduces the output level of the signal to the wave combiner 31, and drops the level of the pilot signal to the level during ordinary communication. When the level of the main signal is dropped below the level during communication, the system control circuit 42 controls the amplifier 32 by a command signal SL to thereby amplify the level of the input signal from the transmission signal input end 33 to a communicable level.

After the termination of the adjustment of the direction of emergence of the beam of light in the apparatus A (the state of FIG. 5D), the direction of emergence, the angle of expanse and the output level of the beam of light are likewise adjusted in the apparatus B when the tracking start switch 43 is connected, and the apparatus A and the apparatus B become capable of effecting transmission/reception. Still after the start of communication, the tracking control circuit 26 sequentially monitors the position of the spot image S on the PIN photodiode 37, adjusts the movable mirror 23 by the actuators 24 and 25 and effects the tracking of the transmission/reception beam of light.

The above-described tracking is particularly effective when the communication distance is long.

In the example shown in FIGS. 5A to 5D, the adjustment of the direction of emergence in the apparatus B is started after the termination of the adjustment of the direction of emergence in the apparatus A, but in the state of FIG. 5B, the tracking start switch 43 may be connected in the apparatus A and apparatus B at a time to thereby effect the adjustment of the directions of emergence, the angles of expanse and the output levels of the beams of light.

In the optical space communication apparatus of the present invention, when a transmission distance is inputted in the distance setting device 44, the system control circuit 42 sets the angle of expanse of the beam of light and the amplification factor of the level of the pilot signal in conformity with the transmission distance. For example, when the adjustment of the direction of emergence of the beam of light is to be made, the beam diameter at the receiving point is set to the order of 10 m. In such case, for a transmission distance of 500 m, the angle of expanse of the beam of light on the transmission side is expanded to the order of 1°, and for a transmission distance of 2,000 m, this angle is expanded to the order of 0.3°. After the adjustment of the direction of emergence has been terminated, the beam diameter at the receiving point is set to the order of 2 m. In such case, for a transmission distance of 500 m, the angle of expanse of the beam of light on the transmission side is narrowed to the order of 0.2°, and for a transmission distance of 2,000 m, this angle is narrowed to the order of 0.06°.

The distance setting device 44 is comprised of a potentiometer or the like provided with distance divisions, but alternatively may be comprised of a digital switch.

In this embodiment, the pilot signal is superposed upon the main signal to detect the direction of incidence of the beam of light, but it is also possible to use the main signal as a signal for detecting the direction of incidence of the beam of light. For example, the PIN photodiode 37 is designed to receive the DC component of the main signal. In this method, the detection accuracy of the PIN photodiode 37 is reduced, but there is an advantage that the mechanism can be simplified. Further, instead of the PIN photodiode 37, use may be made of only an element of high response speed which can also detect the high frequency component of the main signal. In such case, the beam dividing mirror 35 and the light receiving element 39 may be eliminated, and the main signal can be received by said element so that tracking and communication may be effected.

In the above-described embodiment, the pilot signal and the main signal are superposed one upon the other by the difference in frequency band, but use can also be made of a method such as wavelength multiplexing, time division multiplexing or code multiplexing. For example, the pilot signal is converted into an optical signal by a light emitting element oscillating a light emission wavelength differing from the main signal, whereafter the optical signal is combined with an optical signal derived from the main signal and the combined optical signal is transmitted as a beam of light. In case of reception, the pilot signal and the main signal are divided in the beam dividing mirror 35 by wavelength. As a result, the pilot signal is transmitted through the beam dividing mirror 35 and is received by the PIN photodiode 37, and the main signal is reflected by the beam dividing mirror 35 and is received by the light receiving element 39. In this case, two light emitting elements differing in wavelength from each other are used and therefore the construction becomes complicated, but the main signal will not be affected even if the output level of the pilot signal is made great.

As described above, the optical space communication apparatus according to the present invention is designed to detect an optical signal of a great angle of expanse and a great output level for adjusting the direction of emergence of the beam of light, and correct the direction of emergence of the beam of light and therefore, even during long distance communication, the adjustment of the direction of the apparatus can be made easily and highly accurately. Also, the manufacturing accuracy of the optical members is alleviated and thus, lower costs can be achieved.

What is claimed is:

1. An optical space communication apparatus for propagating a beam of light through free space to thereby effect communication, comprising:

transmitting means for transmitting a first optical signal converted into a beam of light;

expanse angle varying means for varying an angle of expanse of the beam of light into which the first optical signal has been converted;

level varying means for varying an output level of the first optical signal;

control means for controlling said expanse angle varying means and said level varying means, wherein said control means causes the output level to become greater when the angle of expanse of the beam of light is made greater; and receiving means for receiving a second optical signal converted into a beam of light.

2. The apparatus of claim 1, wherein said control means causes the output level to become smaller when the angle of expanse of the beam of light is made smaller.

3. The apparatus of claim 1, wherein said control means varies the angle of expanse and the output level in conformity with a transmission distance of the first optical signal.

4. An optical space communication apparatus for propagating a beam of light through free space to thereby effect communication, comprising;

transmitting means for transmitting a main signal and a pilot signal converted into beams of light;

expanse angle varying means for varying an angle of expanse of the beams of light into which the main signal and the pilot signal have been converted;

level varying means for varying output levels of the main signal and the pilot signal;

control means for controlling said expanse angle varying means and said level varying means, wherein said control means causes the output level of the pilot signal to become greater when the angle of expanse of the beams of light is made greater; and receiving means for receiving an optical signal converted into a beam of light.

5. The apparatus of claim 4, wherein said control means makes the output level of the pilot signal small when the output level of the main signal is made great, and makes the output level of the pilot signal great when the output level of the main signal is made small.

6. The apparatus of claim 4, wherein the pilot signal differs in frequency band or wavelength from the main signal.

7. A method of adjusting a direction of emergence of a beam of light in an optical space communication system for propagating the beam of light through free space to thereby effect communication, said method comprising the steps of:

(a) transmitting a first optical signal converted into a first beam of light from a first optical space communication apparatus to a second optical space communication apparatus;

(b) varying an angle of expanse of said first beam of light into which the first optical signal has been converted so as to become greater, and varying the output level of the first optical signal so as to become greater when said step (a) is to be executed;

(c) transmitting a second optical signal converted into a second beam of light from the second optical space communication apparatus to the first optical space communication apparatus;

(d) varying an angle of expanse of the second beam of light into which the second optical signal has been converted so as to become greater and varying an output level of the second optical signal so as to become greater when said step (c) is to be executed; and (e) adjusting directions of emergence of the first and second beams of light.

8. An optical space communication apparatus for propagating a beam of light through free space to thereby effect communication, comprising:

transmitting means for transmitting a first optical signal converted into a beam of light;

expanse angle varying means for varying an angle of expanse of the beam of light into which said first optical signal has been converted;

level varying means for varying an output level of said first optical signal; and control means for controlling said expanse angle varying means and said level varying means, wherein said control means causes the output level of the first optical signal to become greater when the angle of expanse of the beam of light is made greater.

9. An apparatus according to claim 8, wherein said control means causes the output level of the first optical signal to become smaller when the angle of expanse of the beam of light is made smaller.

10. An apparatus according to claim 8, wherein said control means varies the angle of expanse of the beam of light and the output level of the first optical signal in correspondence to a transmission distance of the first optical signal.

11. An optical space communication apparatus for propagating a beam of light through free space to thereby effect communication, comprising:

transmitting means for transmitting a main signal and a pilot signal converted into a beam of light;

expanse angle varying means for varying an angle of expanse of the beams of light into which the main signal and the pilot signal have been converted;

level varying means for varying output levels of the main signal and the pilot signal; and control means for controlling said expanse angle varying means and said level varying means, wherein said control means causes the output level of the pilot signal to become greater when the angle of expanse of the beam of light is made greater.

12. An apparatus according to claim 11, wherein said control means causes the output level of the pilot signal to become smaller when the output level of the main signal is made greater, and wherein said control means causes the output level of the pilot signal to become greater when the output level of the main signal is made smaller.

13. An apparatus according to claim 11, wherein said pilot signal is different in frequency or wavelength from said main signal.

14. A method of adjusting a direction of emergence of a beam of light in an optical space communication system for propagating a beam of light through free space to thereby effect communication, said method comprising the steps of:

(a) transmitting a first optical signal converted into a first beam of light from a first optical space communication apparatus to a second optical space communication apparatus; and (b) varying an angle of expanse of the first beam of light into which the first optical signal has been converted so as to become greater and varying an output level of the first optical signal so as to become greater when said step (a) is to be executed.

* * * * *

UNITED STATES PATENT AND TRADEMARK OFFICE
CERTIFICATE OF CORRECTION

PATENT NO. : 5,594,580
DATED : January 14, 1997
INVENTOR(S) : Sakanaka et al.

It is certified that error appears in the above-indentified patent and that said Letters Patent is hereby corrected as shown below:

On the title page;
[56] FOREIGN PATENT DOCUMENTS:

0241930  9/1989  Japan" should read --1-241930
      9/1989  Japan--.

[56] OTHER PUBLICATIONS:

"*Laser Cross-Link Systems an Technology*" should read
      --*Laser Cross-Link Systems and Technology*--; and
   "Y Ito and J Kitayama," should read --Y. Ito and
      J. Kitayama,--.

[57] ABSTRACT:

Line 6, "a" should read --an--.

COLUMN 6:

Line 31, "to" (second occurrence) should read --will--.

UNITED STATES PATENT AND TRADEMARK OFFICE
CERTIFICATE OF CORRECTION

PATENT NO. : 5,594,580
DATED : January 14, 1997
INVENTOR(S) : Sakanaka et al.

It is certified that error appears in the above-indentified patent and that said Letters Patent is hereby corrected as shown below:

COLUMN 8:

Line 67, "comprising;" should read --comprising:--.

Signed and Sealed this

First Day of July, 1997

Attest:

BRUCE LEHMAN

*Attesting Officer*

*Commissioner of Patents and Trademarks*